(12) United States Patent
Razzano et al.

(10) Patent No.: US 6,492,479 B2
(45) Date of Patent: Dec. 10, 2002

(54) PROCESS FOR PRODUCING FLUOROSILICON POLYMERS

(75) Inventors: John S. Razzano, Cohoes, NY (US); Nancy E. Gosh, East Greenbush, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/935,317

(22) Filed: Aug. 22, 2001

(65) Prior Publication Data

US 2002/0010301 A1 Jan. 24, 2002

Related U.S. Application Data

(62) Division of application No. 09/574,968, filed on May 19, 2000, now abandoned, which is a division of application No. 09/224,336, filed on Dec. 31, 1998, now abandoned.

(51) Int. Cl.$^7$ .............................................. C08G 77/08
(52) U.S. Cl. .............................. 528/14; 528/21; 528/42
(58) Field of Search ................................ 528/14, 21, 42

(56) References Cited

U.S. PATENT DOCUMENTS

| | | | | |
|---|---|---|---|---|
| 4,317,899 A | * | 3/1982 | Bluestein et al. | 528/14 |
| 4,814,418 A | * | 3/1989 | Miyake et al. | 528/37 |
| 4,960,811 A | * | 10/1990 | Evans | 524/265 |
| 5,300,609 A | * | 4/1994 | Kobayashi et al. | 528/14 |
| 5,635,579 A | * | 6/1997 | Evans et al. | 528/37 |
| 6,232,425 B1 | * | 5/2001 | Razzano et al. | 528/23 |

* cited by examiner

*Primary Examiner*—Margaret G. Moore
(74) *Attorney, Agent, or Firm*—Kenneth S. Wheelock

(57) ABSTRACT

The invention comprises a method for producing fluorosilicone oil by reacting a fluorosilicone trimer with a triorganosilanol in the presence of an alkali silanolate. The polymer may be condensed to increase viscosity and decrease the silanol content of the polymer, and volatiles may be removed by stripping. The method provides a high yield of fluorosilicone oil of narrow viscosity ranges in an efficient reaction, and produces small amounts of waste.

5 Claims, No Drawings

PROCESS FOR PRODUCING FLUOROSILICON POLYMERS

This is a divisional of now abandoned application Ser. No. 09/574,968 filed on May 19, 2000, which is a division of Ser. No. 09/224,336, now abandoned, filed Dec. 31, 1998.

FIELD OF THE INVENTION

The invention relates to a process for producing fluorosilicone polymers, such as oils and gums.

BACKGROUND OF THE INVENTION

Fluorosilicone oil is used in a variety of applications such as silicone greases, hydraulic fluids, anti-foam compositions and paper-release compositions. High molecular weight, high viscosity fluorosilicone polymers are known as gums. Fluorosilicone oils are of lower molecular weight and viscosity.

Previously, fluorosilicone oil was produced by a cumbersome and expensive process which resulted in a low yield of product and a significant amount of waste. U.S. Pat. No. 4,267,298 to Bluestein discloses a process for producing triorganosilyl end-stopped diorganopolysiloxane fluids by polymerizing fluoro-substituted cyclic trisiloxane with itself, by reacting it with other cyclo-trisiloxanes in the presence of potassium hydroxide and water, or by reacting it with silanol end-stopped siloxane. The resulting disilanol stopped fluorosilicone oil is then treated with a large excess of trimethylchlorosilane to provide trimethylsiloxy termination. The excess chlorosilane and hydrochloric acid byproduct from chain stopping are removed by adding excess methanol to the reaction and then stripping the methanol, HCl and trimethoxysilane fry the product.

The Bluestein process produces a significant amount of waste acidic methanol and only about 85% oil and 15% volatiles. The process is also inconsistent, and it is difficult to achieve a product with a desired target viscosity. As a result, separate batches of fluorosilicone fluid are typically blended to achieve the final viscosity desired.

U.S. Pat. No. 3,607,899 to Brown discloses a method for producing fluorosilicone oil in which fluorosilicone trimer is reacted with hexamethyldisiloxane in the presence of an acid-activated clay. This process is also cumbersome in that a first reaction occurs at a temperature of 75–90° C., followed by a subsequent reaction at 120–140° C. The reaction is cooled and the acid-activated clay must be removed by filtration. For products exceeding about 1,000 cps, the removal of the acid-activated clay is difficult. Such products first must be dissolved in a solvent. The solution must then be filtered to remove the clay, and the solvent removed by stripping. The yield of product after a long strip of high temperature is described as between 68–82%. The process also generates unusable fluorosilicone volatile waste, adding to the expense and difficulty of the process.

U.S. Pat. No. 4,317,899 to Bluestein et al. discloses a process for producing a fluorosilicone polymer by polymerizing a cyclic polysiloxane with a polymerization catalyst and a low molecular weight silanol terminated diorganopolysiloxane polymer. The process results in very high molecular weight polymers. The patent does not disclose rearrangement of the polymer to disproportionate the fluoropolymer of a given molecular weight with hexaorganodisiloxane to form a final polymer of intermediate molecular weight.

There is a need in the art to produce fluorosilicone polymers such as oils and gums in high yield in an efficient manner, in which the process yields a large amount of product and a limited amount of waste.

SUMMARY OF THE INVENTION

The present invention comprises a process for making fluorosilicone polymers such as oils and gums by reacting a triorganosilanol with a fluorosilicone trimer in the presence of an alkali silanolate, thereby forming a triorganosilyl and silanol end-stopped diorganopolysiloxane; condensing the silanol end-stopped diorganopolysiloxane by removing water from the reaction and/or silylating the diorganopolysiloxane, thereby forming a fluorosilicone of reduced silanol content; and stripping the volatiles from the triorganosilyl end-stopped diorganopolysiloxane polymer.

DETAILED DESCRIPTION OF THE INVENTION

The invention compises reacting a triorganosilanol and a fluorosilicone trimer (hereinafter, "D(F)3") in the presence of an alkali silanolate to yield a species a triorganosily end-stopped diorganopolysiloxane fluid in yields of greater than 95%. The polymer may be condensed, thereby increasing the viscosity of the polymer and reducing the silanol content. Volatiles are removed by stripping.

In an embodiment of the invention triorganosilanol is reacted with D(F)3 in the presence of an alkali silanolate to catalyze polymerization of the D(F)3 and triorganosilanol. The reactants are subjected to condensation wherein water of condensation is removed to drive the polymerization reaction forward. The reaction is stopped by neutralizing the alkali silanolate. Thereafter, volatiles may be removed by stripping.

In another embodiment of the invention, triorganosilanol is reacted with D(F)3 in the presence of an alkali silanolate, thereby forming a triorganosilyl and silanol end-stopped diorganopolysiloxane. The reaction is stopped by neutralizing the alkali silanolate. The polymer is subjected to condensation to form a fluorosilicone oil of increased viscosity and reduced silanol content. A silylating agent may be added to further reduce the silanol content. The volatiles may then be removed by stripping.

Condensation reactions are well known in the art and can be conducted by any method without particular limitation. For instance, the reactants may be contacted in the presence of a condensation catalyst while the water of condensation is removed by vacuum distillation or by a nitrogen purge. Removing the water of condensation drives the polymerization reaction forward, increasing the viscosity and reducing the silanol content of the product.

Stripping of volatiles is well known in the art and may be accomplished by any method. After the silanolate catalyst has been neutralized, the product is heated to a temperature of no more than about 250° C. and the volatiles are removed by vacuum or by employing a nitrogen purge. Stripping reduces the volatiles content of the final product.

The fluorosilicone trimer used in the present invention has the general formula (I):

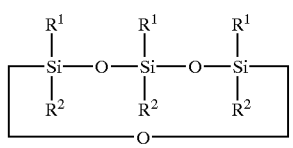
(I)

wherein $R^1$ is a monovalent hydrocarbon of 1–8 carbon atoms, and $R^2$ is a perfluoroalkylethyleneyl radical of 3–8 carbon atoms. Of the trifluorosilicone trimers useful in the present invention, 1,3,5-tris(3,3,3-trifluoropropyl)-1,3,5-trimethylcyclotrisiloxane is preferred. D(F)3 is added in amounts suitable for obtaining the particular amount of polymer in the target size range and viscosity. Polymers of the present invention may range in viscosity from about 50–100,000,000 centipoises (cps). Target polymer sizes are influenced by the amount of chain-stopping triorganosilanol added to the D(F)3.

The triorganosilanols which may be used in the process of the invention have the general formula $(R^3)_3SiOH$, wherein $R^3$ is a monovalent hydrocarbon radical of 1–8 carbon atoms. Examples of triorganosilanols which are useful in the present invention include, but are not limited to trimethylthsilanol, dimethylvinylsilanol, triethylsilanol, tripropylsilanol, tributylsilanol, tripentylsilanol and triphenylsilanol, and the like. Of the triorganosilanols that are useful in the present invention, trimethylsilanol and dimethylvinylsilanol are preferred.

The triorganosilanols are added in amounts selected based on the target viscosity of the final product. A wide range of viscosities may be achieved by varying the amount of the triorganosilanol employed in the reaction and whether the product is condensed and/or treated with a silylating agent. The overall range that may be achieved using the process of the invention may be from about 50 to about 100,000,000 cps. Viscosities in the is range of 300–10,000,000 are more easily achieved. The viscosities achieved are a function of the amount of triorganosilanol added. Triorganosilanol in an amount of about 1.0 wt % yields fluorosilicone oil with a viscosity of about 18,000–19,500 cps. Triorganosilanol in an amount of about 2.0 wt % yields fluorosilicone oil with a viscosity of about 9,000–10,000 cps. Triorganosilanol in an amount of about 3.0 wt % yields fluorosilicone oil with a viscosity of about 1,250–1,350 cps. Triorganosilanol in an amount of about 4.0 wt % yields fluorosilicone oil with a viscosity of about 1,050–1,150 cps. Triorganosilanols in an amount of about 5 wt % yields a fluorosilicone oil with a viscosity of about 950–1,050 cps. Very low viscosity fluorosilicone oil, such as 50 cps, would require a great amount of triorganosilanol, such as 30% or more.

The alkali silanolate is included in an effective amount to open the ring of the fluorosilicone trimer. The alkali silanolates that may be used in the present invention include equivalents of an alkali metal base, such as NaOH. NaOH polymerizes the fluorosilicone trimer in a non-equilibrium reaction to give high polymer yields. Generally, NaOH is included in the amount about 10–1000 parts per million (ppm). More preferably, NaOH is added in an amount of about 10–100 ppm. NaOH is preferably added as a solution such as sodium fluorosilanolate. At low temperatures, potassium hydroxide may also be used, however, NaOH is preferred.

The NaOH-catalyzed polymerization reaction is conducted at a temperature of about 80–150° C. More preferably, the reaction is conducted at a temperature of about 125–140° C., most preferably at a temperature of 135° C. Below about 80° C., the polymerization will proceed too slowly. Above about 150° C., depolymerization begins to take place, and is therefore, not preferred.

Triorganosilanols react completely and easily with D(F)3 in the presence of an alkali metal silanolate to form triorganosilyl and silanol end-stopped diorganopolysiloxane fluids in yields of about 95% or more. The product can be further condensed to reduce the silanol content. Condensation reduces silanol content to a low level. If, however, further reduction of silanol content is desired, a silylating agent may be added to the reaction to yield a product which is essentially free of silanol. Silylating agents that are useful in the present invention include, but are not limited to hexamethyldisilazane (HMDZ), trimethylsilamine, 1,3-divinyltetramethyidisiloxane, and the like. Of the silylating agents that may be used in the present invention, HMDZ is preferred. The silylating agents are generally included in an amount of about 0.5 to 5.0 moles of silylating agent per mole of silanol, more preferably about 0.5 to 2.5 moles of silylating agent per mole of silanol, most preferably about 1.0 to 1.5 moles of silylating agent per mole of silanol.

The reaction is stopped by neutralizing, and therefore, deactivating the alkali silanolate catalyst. The alkali silanolate catalyst is deactivated to prevent subsequent polymer decomposition. In order to neutralize the catalyst, an acid may be added. Suitable acids include virtually any moderate to strong acid. Examples of acids suitable in the invention include, but are not limited to, phosphoric acid, nitric acid, hydrochloric acid, sulfuric acid, hydrobromic acid, hydrogen iodide, sulfonic acids, carbonic acid, propionic acid, formic acid, benzoic acid, dicarboxylic acids, such as oxalic, phthalic, sebacic and adipic acids, salicylic acid, and fatty acids such as palmitic, stearic, and phenylstearic acid. Furthermore halogenated organic compounds, such as octyl chloride, may also be used. Therefore, acetic acids may even be used. The amount of acetic acids can be in excess of the base to be neutralized as acetic acids are volatile and can be stripped out of the reaction mixture. Other acids that are not so volatile and easily removed by stripping should not be used in excess. For example, stearic acid should not be used in excess.

Of the acids suitable for use in the invention, a soluble form of phosphoric acid or silylphosphate is preferred. When using soluble phosphoric acid, suitable concentrations include about 1.0 to 30% phosphoric acid equivalent. An 85% solution of phosphoric acid is not soluble in the polymer and requires a longer time to react completely. Silyphosphate, such as a dimethylsilicone/phosphoric acid copolymer, has phosphoric acid equivalents. Silylphosphate and phosphoric acid are preferred because they effect a natual buffer system which is not so sensitive to overloading or underloading the neutralization agent. The desired neutrality point is to produce $NaH_2PO_4/Na_2HPO_4$. Less silyphosphate will shift the ratio to favor $Na_2HPO_4$, while more silyphosphate will shift the ratio to $NaH_2PO_4$. The phosporic acid based neutralization agents are favored because the salts are neutral and the target neutralization point is a buffer.

The reaction of the fluorosilicone trimer and the triorganosilanol yields a linear oligomer/polymer of the formula (II):

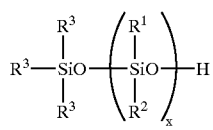

(II)

wherein $R^1$ is a monovalent hydrocarbon of 1–8 carbons, $R^2$ is a perfluoroalkylethyleneyl radical of 3–8 carbons, $R^3$ is a monovalent hydrocarbon of 1–8 carbons, and wherein x is about 3 or more, typically, about 3–6000. Upon condensation to reduce the silanol content and increase viscosity of the polymer, triorganosilanol can react with the oligomer/polymer to yield a polymer of the formula (III):

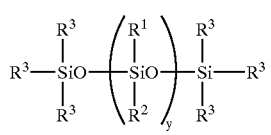

(III)

wherein R1 is a monovalent hydrocarbon of 1–8 carbons, $R^2$ is a perfluoroalkylethylenyl radical of 3–8 carbons, $R^3$ is a monovalent hydrocarbon of 1–8 carbons, and wherein y is 6 or more, typically, about 3–6000.

D(F)3 may also be polymerized with a organic chain stopper of the formula (IV):

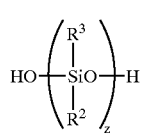

(IV)

wherein $R^2$ is a perfluoroalkylethyleneyl radical of 3–8 carbons, $R^3$ is a monovalent hydrocarbon radical of 1–8 carbons, and z is an integer of about 2–10. In this case, the fluorosilicone trimer and the diol could quickly polymerize into a large polymer in a reaction in which the molecular weight would be difficult to control because of possible condensation. For high molecular weight polymers, such as fluorosilicone gums, this may not be a concern because the silanol content is so low. The viscosity of the polymer is high and has a low silanol content. The silanols may be reduced further by treating the polymer with a silylating agent. However, for low molecular weight polymers, such as oils, the silanol content is much higher and therefore, the polymer may condense with itself making the control of precise molecular weight difficult.

In general, a silylating agent may be added to reduce the silanol content and increase the organic capping of the polymers.

Alternatively, a silylating agent can be added directly to the product of Formula (I) to remove all of the silanol content, without the need for a condensation reaction. The decision of whether to condense the polymer before adding a silylating agent, or to add the silylating agent without precondensing is based amount of silanol in the polymer. If there is a high silanol content in the polymer, more silylating agent is required. In such a case, it may be beneficial to precondense in order to lower the silanol content before adding the silylating agent. In cases where the amount of silanol in the polymer is low, a silylating agent may be added directly to further reduce the silanol content without precondensing.

The yield of fluorosilicone polymer from the process is generally 95% or greater. As the volatiles specification of fluorosilicone polymers is generally desired to be less than 1%, volatiles may be removed by a high temperature strip. The high temperature strip is not particularly limited, but may be accomplished by applying a vacuum to the fluorosilicone polymers and heating the mixture to a temperature of no greater than about 250° C. Alternatively, one may employ a nitrogen purge or its equivalent with a temperature of no more than about 250° C. The temperature of the stripping may be adjusted when a vacuum is applied, as will be known to those skilled in the art.

In one embodiment of the invention, triorganosily endstopped diorganopolysiloxane fluids may be formed when treated with a silylating agent to produce the fluorosilicone oil. The yield of product from the reaction is typically about 95%. The volatiles in the fluorosilicone oil is generally greater than about 1%. Of the silylating agents which are useful in the embodiment, HMDZ is preferred.

In another embodiment of the invention, D(F)3 can be reacted with an organic chain stopping compound, such as a triorganosilanol or a diol of Formula (IV), in the presence of an alkali metal silanolate to produce a medium to high viscosity oil. Hexaorganodisiloxane may then be added with a rearrangement catalyst, such as linear phosphonitrilic chloride (LPNC). The LPNC catalyst will neutralize the original NaOH polymerization catalyst and catalyze the rearrangement reaction between the hexaorganodisiloxane and the original medium to high viscosity fluorosilicone oil. Triorgano- groups of the hexaorganodisiloxane are incorporated into the polymer in the rearrangement reaction, without forming cyclic molecules. By varying the proportions of the fluorosilicone oil and the hexaorganodisiloxane, one can obtain a target viscosity of the oil. For example, 1 mole of Hexaorganodisiloxane to 16 moles of the fluorosilicone oil will reduce the viscosity to about 1000 cps without generating cyclic molecules. By varying the proportion of hexaorganodisiloxane to the initial fluorosilicone oil of medium to high viscosity, the viscosity of the oil can be reduced to as little as 50 cps. Viscosity reduction may be as much as 1000 to 1. The process gives high yield of polymer and precise control of the viscosity. Furthermore hexaorganodisiloxane is less expensive than triorganosilanol, so the process is also cost effective.

A high temperature strip may be performed to remove volatiles from the final product. However, the waste stream is small and, therefore, the material costs are lower than conventional processes. The process of the present invention is also more efficient and reproducible than conventional processes, providing fluorosilicone oil of narrow viscosity ranges.

EXAMPLES

Example 1

Three separate experiments (Reactions A, B and C) were performed in which 400 g of 1,3,5-tris (3,3,3-trifluoropropyl) cyclotrisiloxane were placed in a 500 ml flask with a stirrer and a nitrogen purge. The flask was heated to 135° C. in an oil bath. Dimethylvinylsilanol (88% pure, containing 12% tetramethyidivinyldisiloxane) was added to each flask after the temperature reached 135° C. The amount of dimethylvinylsilanol added to each reaction was as follows: Reaction A, 2.0 g; Reaction B, 5.0 g; and Reaction C, 8.0 g. Sodium fluorosilanolate (0.12 ml) containing 4% equivalent NaOH was added to the flasks. A small exothermic reaction resulted which raised the temperatures to about 140° C. Each reaction was carried out for 2.5 hours. A vacuum was applied at 15 Torr for 30 minutes with agitation at a temperature of 135° C. to effect condensation of the silanols. To neutralize the sodium hydroxide, 0.4 g of a dimethylsilicone/phosphoric acid copolymer containing 10% $H_3PO_4$ equivalent was added. A 1.0 g sample of each of the three reactions was placed in small aluminum cups and the weight losses were measured at 135° C. for 45 minutes at 15 Torr. The amount of specific dimethylvinylsilanol and the properties of the fluorosilicone oil products were as follows:

| Sample | Dimethylvinylsilanol (g) | Viscosity | Weight Loss (%) |
|--------|--------------------------|-----------|-----------------|
| A | 2 | 26300 | 1.74 |
| B | 5 | 9450 | 4.5 |
| C | 8 | 3840 | 5.9 |

Although the weight losses were slightly different, increased levels of dimethylvinylsilanol increased weight loss. The semi-logarithmic plot of viscosity vs. dimethylvinylsilanol is a substantially straight line demonstrating effective reaction of the dimethylsilanol with D(F)3 to produce a polymer containing dimethylvinyl groups and silanol groups in the polymer, and the effective removal of silanol by condensation.

Example 2

Two high molecular weight fluorosilicone polymers were produced using dimethylvinylsilanol as a chain-stopping compound. To each 500 flask with a stirrer and nitrogen purge, 400 g of 1,3,5-tris(3,3,3-trifluoropropyl) cyclotrisiloxane was added along with dimethylvinylsilanol (88% purity, 12% tetramethyidivinyldisiloxane). Batch A contained 0.024 g dimethylvinylsilanol, and Batch B contained 0.1152 g dimethylvinylsilanol. Both batches were subjected to a nitrogen purge, agitated, and heated to 135° C. in an oil bath. To each batch, 0.12 g of a sodium fluorosilanolate with 4% equivalent NaOH was added at a temperature of 135° C. A small exothermic reaction occurred within 10 minutes, and the viscosity increased so dramatically that the stirrer stalled. The reaction continued for a total of 30 minutes. Polymer A used 0.115 g of the dimethylvinylsilanol and Polymer B used 0.024 g of the dimethylvinylsilanol. The viscosities of both polymers were very high, therefore, the viscosities were measured in a plastometer, Model P-2, manufactured by Wallace Instruments. The sample heights were 5 mm. The plasticity, after a 3 minute measurement time, for Polymer A was 2.65 mm and the plasticity of Polymer B was 1.24 mm. Plasticity is a measurement of sample thickness at the end of the test time after the application of a specified weight. Therefore, the higher the value, the higher the viscosity of the sample. Polymer A has less chain-stopping groups than Polymer B. Therefore, Polymer A has the higher viscosity. Each of the samples exhibited a weight loss of about 2.6 wt % after 45 minutes at 135° C. and 15 mm Hg.

Example 3

A low viscosity fluorosilicone oil was produced by adding 400 g of 1,3,5-tris(3,3,3-trifluoropropyl)cyclotrisiloxane to a stirred reactor with an agitator and a nitrogen purge. The batch was heated to 135° C. in an oil bath. Sodium fluorosilanolate (0.12 g) with 4% NaOH equivalence was added as a polymerization catalyst. Immediately after the catalyst was added, 16 g of 85% trimethylsilanol (15% hexamethyldisiloxane) was added over the course of 2 minutes. Within 5 minutes after the catalyst had been added, the so temperature rose to 145° C. The reaction mass was a low viscosity oil. Ten minutes after the catalyst had been added, water of condensation was noted and the batch was placed under an aspirator vacuum to remove water condensation and to drive the condensation reaction in order to leave the product with a low silanol content. After a total of 3 hours of polymerization/vacuum treatment, the catalyst was neutralized with 0.15 g of a silyphosphate of 10% equivalent phosphoric acid. The batch was then stripped at 160° C. at 1 mm Hg. A yield of 387 g of fluorosilicone oil was isolated with a viscosity of 1040 cps.

Example 4

1,3,5-tris(3,3,3-trifluoropropyl)cyclotrisiloxane (400 g) was added to a flask with a stirrer and a nitrogen purge. The batch was heated to 130° C. and 15.2 g of 85% trimethylsilanol (15% hexamethyldisiloxane) were added, followed by the addition of 0.12 g of sodium fluorosilanolate of 4% equivalent NaOH. An exothermic reaction caused the temperature to reach 142° C. eight minutes after the catalyst was added. The polymerization was carried out for a total of 33 minutes during which water of condensation formed in the flask. After 33 minutes following addition of the catalyst, 0.14 g of a silyphosphate containing 10% $H_3PO_4$ equivalence was added to neutralize the catalyst. Water of condensation was removed with an aspirator vacuum and the silanol content was measured by FTIR at 1243 ppm. Hexamethyldisilazane (5 g) was added to react with the residual silanols, and the batch was held at 135° C. Low molecular weight volatiles were removed under vacuum. The final silanol content of the oil was 78 ppm by FTIR, the viscosity was 1280 cps, and the weight loss after 45 minutes at 135° C. at 15 mm Hg was 1.8%.

Example 5

1000 g of fluorosilicone trimer was added to a stirred reactor and heated to 135° C. At 135° C., 6 g of trimethylsilanol (85% trimethylsilanol, 15% hexamethyldisiloxane) were added along with 0.3 g of a sodium fluorosilanolate containing 4% sodium hydroxide equivalent. An exothermic reaction occurred, and the temperature reached 142° C. ten minutes after catalyst addition. The reaction was continued for 2 hours at 135° C., producing a medium to high viscosity oil. The temperature was reduced to 95° C., and 50 g of hexamethyldisiloxane were added along with 2 g of a 5% solution of LPNC catalyst in methylene chloride. This amount of LPNC catalyst will neutralize the original NaOH polymerization catalyst and provide about 90 ppm LPNC for the rearrangement reaction between the hexamethyldisiloxane and the original medium to high viscosity fluorosilicone oil. The temperature was maintained at 90° C., and the viscosity of the product in the reactor dropped quickly and dramatically. The reaction was continued for 3 hours. The weight loss of a 1 g sample at 135° C. and 15 mm for 45 minutes was 3.6%. 1 gram of hexamethyldisilazane was added to the batch and produced a haze from the formed ammonium chloride. The batch was stripped at 235° C. and 5 mm to yield 925 g of clear oil with a viscosity of 1050 cps.

The foregoing Examples are provided for the purpose of illustrating the process of the present invention. The Examples are not to be construed for the purpose of limiting the scope of the invention, which is defined in the appended claims.

What is claimed is:

1. A method for producing fluorosilicone polymers, comprising:

reacting an organic chain-stopping compound in the presence of a first alkali silanolate, with a fluorosilicone trimer of the formula:

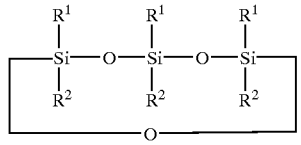

wherein
$R^1$ is a monovalent hydrocarbon of 1–8 atoms, $R^2$ is a perfluoroalkylethylene radical of 3–8 carbon atoms, forming a polymer solution containing a first polymer; and adding a hexaorganosiloxane and a rearrangement catalyst to said polymer solution.

2. The method according to claim 1, wherein said organic chain-stopping compound is a triorganosilanol.

3. The method according to claim 1, wherein said organic chain-stopping compound is of the formula:

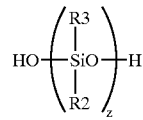

wherein

R3 is a monovalent hydrocarbon radical of 1–8 carbon atoms, R2 is a perfluoroalkylethylene radical of 3–8 carbon atoms, and z is an integer of about 2 to 10.

4. The method according to claim 1, wherein said rearrangement catalyst is linear phosphonitrilic chloride.

5. The method according to claim 2, wherein said hexaorganodisiloxane is hexamethyldisiloxane.

* * * * *